UNITED STATES PATENT OFFICE.

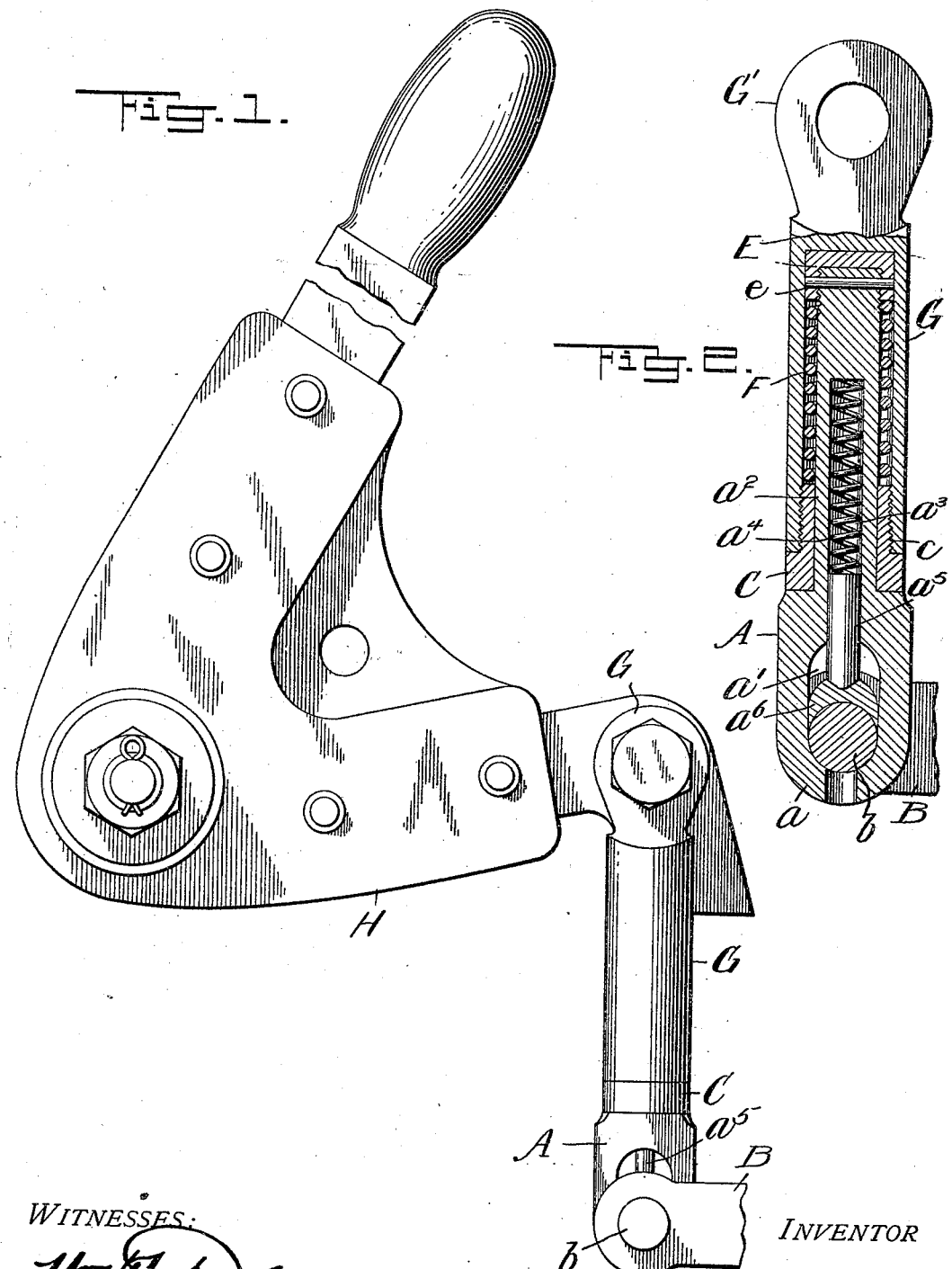

ROBERT V. LONGTINE, OF LOS ANGELES, CALIFORNIA, ASSIGNOR OF ONE-HALF TO FRED E. WINDSOR, OF WARREN, PENNSYLVANIA, AND ONE-HALF TO W. R. GUIBERSON, OF COALINGA, CALIFORNIA.

DEVICE FOR CONTROLLING ENGINES.

960,653.  Specification of Letters Patent.  Patented June 7, 1910.

Application filed November 1, 1909. Serial No. 525,771.

*To all whom it may concern:*

Be it known that I, ROBERT V. LONGTINE, citizen of the United States, residing at Los Angeles, in the county of Los Angeles and State of California, have invented certain new and useful Improvements in Devices for Controlling Engines; and I do hereby declare the following to be a full, clear, and exact description of the invention, such as will enable others skilled in the art to which it appertains to make and use the same.

My invention relates to devices for starting, stopping and reversing engines, and consists of certain new and useful improvements in the same by means of which wear and tear of the link of the engine is avoided, and jerking, hammering and vibration of the parts obviated.

In order that my invention may be understood, I have illustrated it in the accompanying drawings, and described it in the specifications following, pointing out the specific details thereof in the claims.

In the drawings, Figure 1 is a side elevation of my invention, and Fig. 2 is a sectional view of the same, without the lever.

Similar letters of reference indicate identical parts throughout.

A represents a plunger constructed substantially as shown and being provided with a shoe $a$ by which the device is connected with the link of the engine, by an ordinary link pin $b$ which is allowed vertical movement in the slot $a'$ as hereinafter set forth.

The shank $a^2$ of the plunger A is provided with a channel $a^3$ at a portion of its length, to receive a coiled spring $a^4$ which is held in place by a plug $a^5$, the lower end of which is made to engage a depression in the part $a^6$ which is concaved and rests upon the link pin $b$.

C is a nut adapted to be slipped on the shank of the plunger into engagement with the shoe, and has a reduced portion exteriorly screw threaded, as at $c$. The end of the plunger shank $a^2$ is also screw threaded to engage a nut, which may be held in place by means of a pin $e$ after it is screwed upon the shank.

F is a coiled spring adapted to be slipped upon the shank $a^2$ between the nuts E and C.

G is a sleeve or shell, the lower end of which is interiorly screw threaded to engage the nut C, and is provided with a part G' by which it is pivotally connected to the lever H in a well known manner, the said lever H being pivotally connected to a suitable part of the apparatus with which the device is used. It is obvious that the sleeve or shell G covers the nut E and the coiled spring F.

The mode of operation of the device is obvious. When the handle of the lever H is pulled, the link B is raised against the pressure of the spring G, which obviates any jar while the spring $a^4$ operating in the opposite direction affords a connection which is resilient and yielding at all times, and accomplishes the objects of my invention, which have been previously set forth.

What I claim and desire to secure by Letters Patent is:—

1. In devices for controlling an engine, the combination with a hand lever, of means adapted to connect it with a valve gear, consisting of a socket member directly pivoted to said hand lever, a plunger in said socket member, a spring interposed between the socket member and said plunger adapted to resist the outward movement of said plunger, said plunger being provided with a seat adapted to receive a pin connected with said valve gear, a movable plug mounted in said plunger and a spring for pressing said plug outwardly, said plug and spring being adapted to bear on the side of said pin opposite the side engaging the said seat.

2. In devices for controlling an engine, the combination with a hand lever and means adapted to connect it with the valve gear link consisting of a socket member and a plunger movably mounted in said socket member, a spring resisting the outward movement of said plunger, said plunger having a link pin seat, a movable part forming the upper portion of the link pin seat, a movable plug for engaging the upper portion of said link pin seat and a spring pressing it against said part.

In testimony whereof I affix my signature, in the presence of two witnesses.

ROBERT V. LONGTINE.

Witnesses:
ALICE ROOKWOOD,
JACK BLOCH.